Jan. 20, 1942.  A. V. MERSHON  2,270,760
TRANSMISSION DYNAMOMETER
Filed Sept. 30, 1939  2 Sheets-Sheet 1
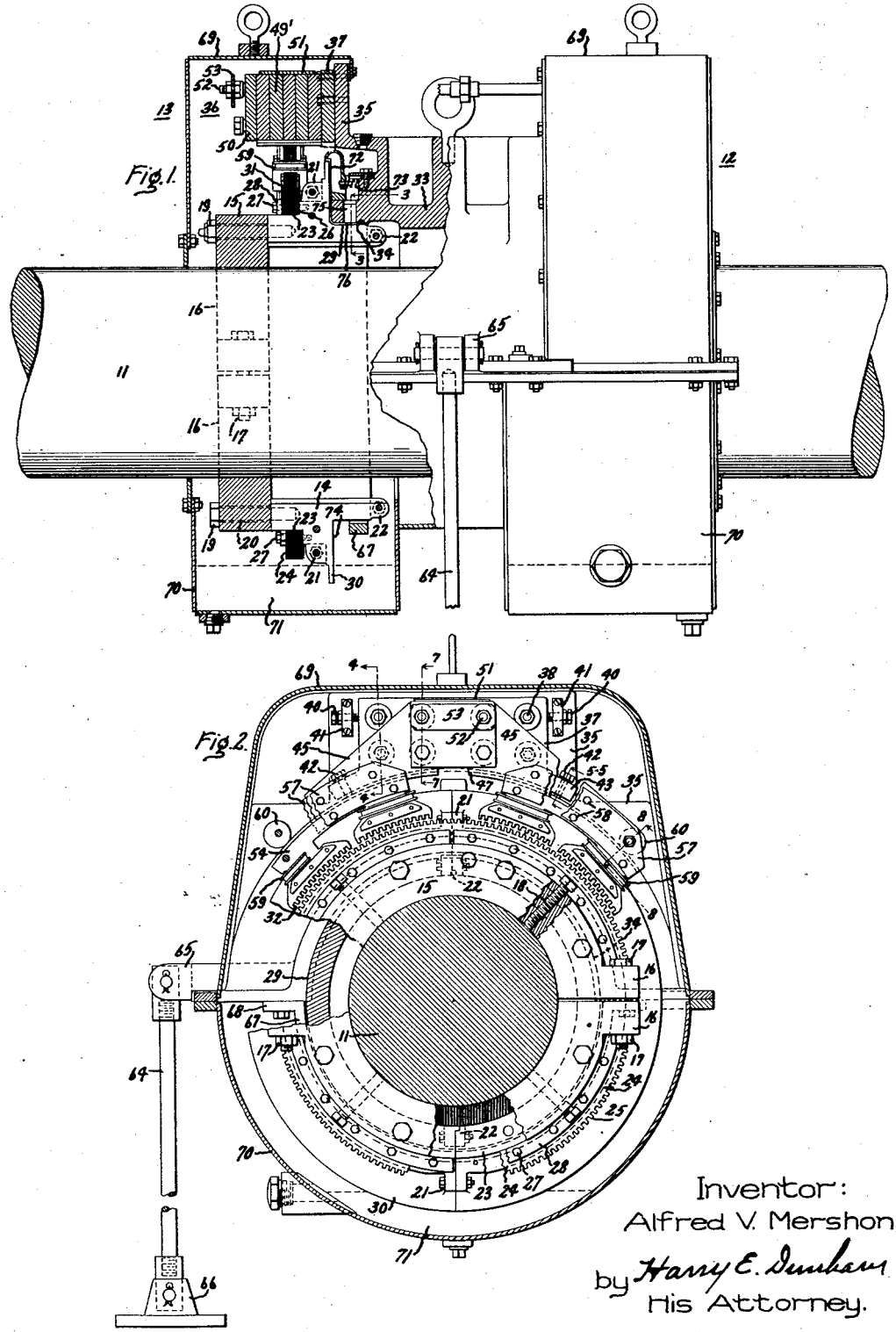
Inventor:
Alfred V. Mershon,
by Harry E. Dunham
His Attorney.

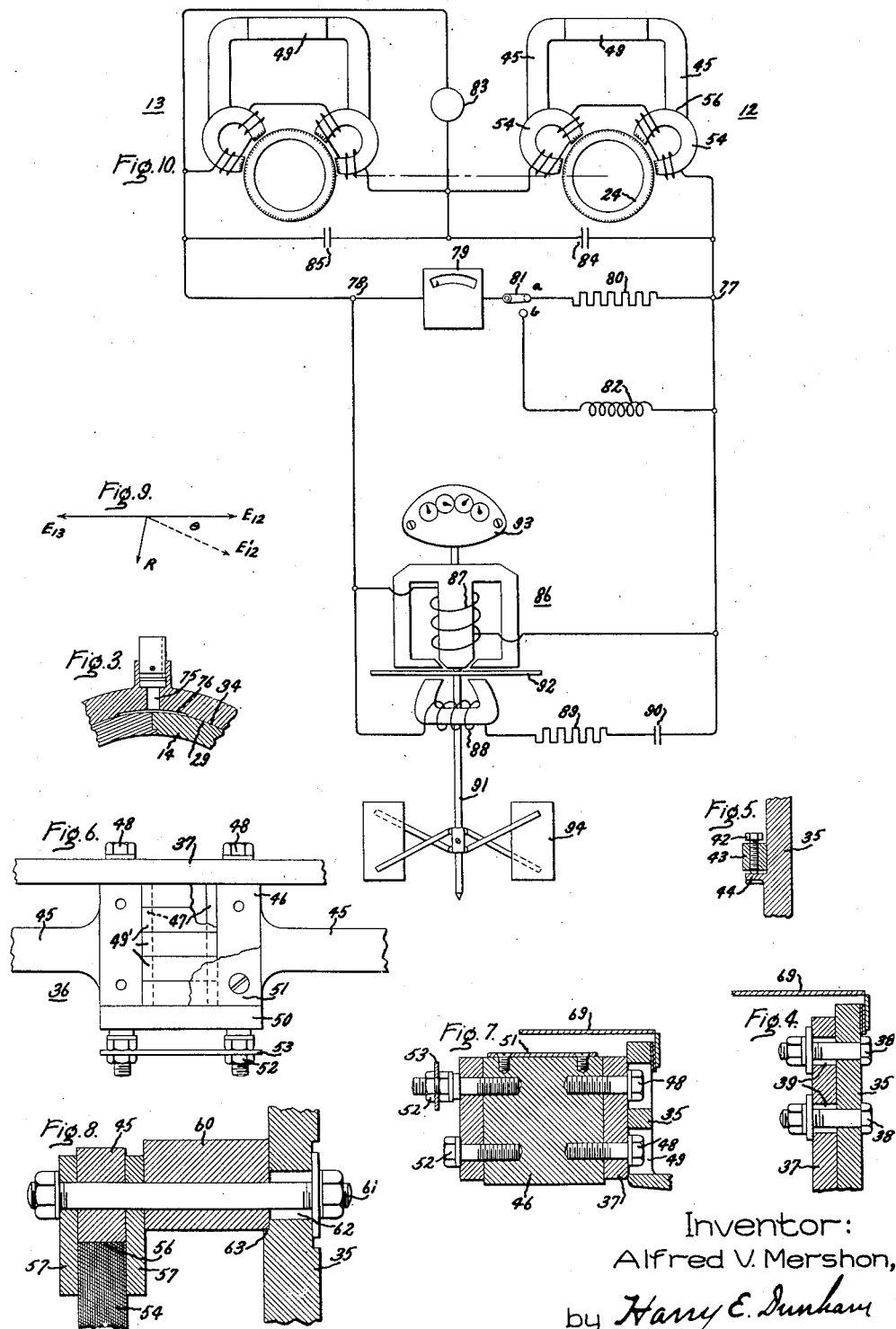

Patented Jan. 20, 1942

2,270,760

UNITED STATES PATENT OFFICE 2,270,760

TRANSMISSION DYNAMOMETER

Alfred V. Mershon, Scotia, N. Y., assignor to General Electric Company, a corporation of New York Application September 30, 1939, Serial No. 297,313

2 Claims. (Cl. 265—25)

This invention relates to transmission dynamometers and more particularly to transmission dynamometers for electrically measuring the torque, horsepower and horsepower hours transmitted by a mechanical member.

While I shall describe my invention as applied to the specific problem of measuring and indicating the torque, horsepower, and energy transmitted by a prime mover to a propeller in connection with the operation of turbine gear propulsion apparatus, this merely forms one of its most useful fields of application, and the specific illustration of the use is not intended to be in anywise limiting. As another specific illustration, the principles of my invention may also be applied advantageously to the problem of power and torque measurements in aeroplane propeller shafts.

There have been many different methods and apparatus proposed for measuring torque or horsepower of shafts, including those employing two generators spaced apart on a shaft, but none of these devices to my knowledge have been put into practical use for indicating horsepower or torque on an electrical instrument or for measuring horsepower-hours by means of an electrical meter. This has been my observation notwithstanding the fact that there is a pronounced demand in the art for apparatus of this character. The present invention aims to provide a device which will meet that demand.

In studying the problem, I have observed that the conditions attendant in the operation of ship propulsion apparatus present difficulties which, so far as prior torque and horsepower measuring arrangements are concerned, have until the present time remained unsolved. In the operation of a ship, for example, there occurs a weaving and twisting of the hull or framework of the ship and as a result of this and variations in the load transmitted, the power transmitting shaft, at a given point, does not maintain a fixed axis of rotation relative to the framework of the ship. If accuracy of measurement can be maintained under such conditions, a great advantage will be gained. To obtain this accuracy requires that the adverse effects of the above factors entering into the operation be eliminated from the measurement results.

In addition, it seems to have previously been a rather commonly accepted view that in order to obtain a sufficiently sensitive measuring device, the twist must be measured in a relatively long length of the power transmitting shaft. This produces an inconveniently long unit for which space is often not readily obtainable. Furthermore, while it may be desirable to measure the twist in a long length of the shaft from the standpoint of obtaining increased sensitivity, such a length of shaft is less likely to run true under all conditions of loading. Consequently, an increase in sensitivity obtained in this way merely tends to aggravate the discrepancies in measurement due to shaft displacement.

The problem which confronts me, therefore, is that of providing an electrical transmission dynamometer of the two-generator type which will be accurate, readily installable, of simple construction, and which is suitable for installation on a relatively short section of the power transmitting shaft.

It is therefore an object of my invention to provide a transmission dynamometer for performing the aforementioned measurement functions wherein weaving and twisting of the ship, as well as wide variations in loading, have no appreciable effect on the measurement results.

Another object of my invention is to provide an improved transmission dynamometer for electrically measuring the torsional force and power in a rotating shaft, and, if desired, the energy expended over a period of time.

Another object of my invention is to provide an arrangement for electrically measuring the torque and horsepower transmitted by a mechanical element on a single electrical instrument.

Still another object of my invention is to provide an improved electrical transmission dynamometer in which the stator elements of the dynamometer are maintained in fixed relative phase position regardless of weaving and twisting of the ship or other supporting structure.

A further object of my invention is to provide improved means for mounting the stator elements of the dynamometer rigid in regard to the motion of the shaft to maintain constant air gaps between the armature pole faces and the rotor teeth when the shaft is rotated, under all conditions of operation.

A still further object of my invention is to provide improved means for securing the rotor elements to the power transmitting shaft.

Other and further objects and advantages will become apparent as the description proceeds.

In accordance with my invention in its preferred form, I provide a plurality of inductor-type alternating-current generators having split rotors mounted in spaced relation and secured fast to the shaft in which the torsional force and transmitted power is to be measured. The two stator elements are joined by rigid common frame or interconnecting structure having bearing surfaces which ride on corresponding bearing surfaces secured to each rotor element. The relative position of the two stators on the frame is made adjustable to provide the proper phase relation between their generated voltages at zero torque. A tie member fixed to the framework of the ship and the interconnecting structure secures the latter against rotation about the two rotor bearing surfaces. I provide a plurality of high coercive force permanent magnets to maintain constant excitation for the two generators. The two generators are connected electrically in series opposition and initially adjusted for zero voltage output under no-load conditions on the shaft. Under such conditions when a load is applied to the revolving shaft, the torque will cause a small amount of twist in the shaft. The two generated voltages will no longer be 180 degrees out of phase but they will be displaced in phase an amount proportional to the angular deflection of the shaft and the magnitude of the resultant voltage generated is proportional to the product of the shaft twist or angular deflection and the speed of rotation. I provide suitable means for measuring the voltage outputs of these two alternators in terms of torque, horsepower, and horsepower-hours.

The novel features which are characteristic of my invention are set forth with particularity in the appended claims. My invention, however, both as to its organization and its method of operation will be better understood from reference to the following description when considered in connection with the accompanying drawings in which Fig. 1 is a view in elevation, partly in section, of apparatus constructed in accordance with my invention; Fig. 2 is an end view, with a portion cut away, looking toward the left end of the apparatus of Fig. 1 with the end portion of the cover removed; Fig. 3 is a detailed section view taken along the line 3—3 of Fig. 1; Fig. 4 is a sectional view taken along the line 4—4 of Fig. 2; Fig. 5 is a sectional view taken along the line 5—5 of Fig. 2; Fig. 6 is a plan view, with a portion cut away, of the permanent magnet field assembly; Fig. 7 is a sectional view taken along the line 7—7 of Fig. 2; Fig. 8 is a sectional view taken along the line 8—8 of Fig. 2; Fig. 9 is a vector diagram which will be used for explaining the principle of operation of the apparatus of my invention; and Fig. 10 is a schematic electrical circuit diagram of the apparatus employed with my invention.

Referring to the drawings, the numeral 11 designates a power transmitting shaft through which all of the mechanical effort is exerted upon a load by a prime mover (not shown). The numerals 12 and 13 represent two inductor-type alternator assemblies which cooperate to form my improved transmission dynamometer. A rotor spider 14 of each alternator is supported from the shaft 11 through a collar, shoulder or base ring 15 in the form of a detachable two-part split ring. The parts 16, 16 of the collar or ring are clamped together about the shaft by means of a plurality of bolts 17 and they are properly centered with respect to the shaft as an axis and secured against slipping by means of a plurality of studs 18 which pass through the ring in a radial direction. The split annular spider or rotor element 14 of each generator is secured to one of the base rings 15 one-half at a time by means of a plurality of bolts or studs 19 each of which passes through an opening 20 of the ring and engages the spider. As will be seen, each of the bolts 19 has a sufficient clearance in the openings 20 to permit the rotor element to be concentrically positioned about the shaft 11. While the illustrated embodiment of the collar or ring 15 has certain advantages from both a manufacturing and flexibility standpoint, however, in order to avoid slippage of the collar relative to the shaft, it may be found desirable to form the collar or shoulder integral with the shaft. With such a construction there is no possibility of relative movement between the rotor and that portion of the shaft to which it is secured. By employing a detachable collar or shoulder such as the clamping ring 15, clamping rings of different internal diameters may be employed, thereby making the same generators more readily adaptable for shafts of different sizes. With a detachable ring a shaft having a diameter as large as the internal diameter of the rotor spider can be accommodated.

As indicated previously, the annular rotor spider 14 is formed in two sections which are clamped together at 21 and 22. By making the generator rotors in halves, they may be assembled after the shaft has been installed in position in the ship or other structure. The spider is provided with a cylindrical surface 23 on which are mounted a plurality of stacked magnetic laminations 24 having teeth 25 and which form the magnetic circuit of the rotor element. These laminations are positioned about the surface 23 against an annular shoulder 26 and they are firmly secured to the spider 14 by means of a plurality of bolts 27 which pass through openings in a split annular pressure ring 28 engaging the side of the laminations and the laminations 24, and which engage the annular shoulder 26. Each of the rotor spiders 14 is also provided with a cylindrical bearing surface 29 and an annular disk 30 the functions of which will be presently described. By making the rotor spider 14 and the laminations 24 in half sections, the rotor may be mounted readily on the shaft at any time.

I provide means for maintaining the stator elements of the generators 12 and 13 in the same relative position and for supporting the stator elements in such a manner that the spacing or air gaps 31 between the rotor teeth 25 and the stator teeth 32 will be maintained at a fixed value regardless of weaving and twisting of the structural framework of the ship and variations in load. In accordance with the arrangement illustrated, the stators are mounted on a common frame comprising a stiff interconnecting structure or tie member 33 in the form of a cradle, which is provided with two spaced concave bearing surfaces 34 adapted to rest one on each of the corresponding annular rotor bearings surfaces 29 as shown in Figs. 1, 2, and 3. The bearing surfaces 34 which are machined in the common frame 33 are illustrated in Fig. 2 as engaging approximately 180 degrees of the rotor bearing surfaces 29. The common frame or tie member 33 is also provided with a vertical framework 35 at each end which serves as a supporting member for each of the stator assemblies 36.

In the embodiment illustrated the supporting member 35 is constructed as an integral part of the connecting member 33. However, my invention is not limited to such a construction but obviously includes the arrangement wherein the parts are bolted together or joined by welding.

Each of the stator assemblies is attached to the supporting member 35 through a backing member or plate 37 which is constructed of brass, aluminum, or other suitable nonmagnetic material. As illustrated in Figs. 2 and 4, the backing plate is secured to the supporting member 35 by means of a plurality of preferably nonmagnetic bolts 38 having clearance 39 with the backing plate 37 to allow relative movement between the plate and the supporting member. The plate 37 is movable in an arclike path relative to the supporting member 35 by means of two studs or set screws 40 which are in threaded engagement with brackets 41 attached to the supporting member. Also, the plate 37 is movable in a vertical plane by means of two adjusting screws 42 which are in threaded engagement with arms 43 of the plate 37 and which rest against brackets 44 of the supporting member 35, as shown in Figs. 2 and 5. The first means provides for adjusting the relative phase position of the voltages generated by the alternators and the second means provides for varying the air gap 31 in order to adjust the magnitude of the generated voltages to the desired value for a given excitation and speed.

The stator assembly comprises a pair of yokes 45 of magnetic material such as soft iron, having enlarged end portions 46 and lower lip or projecting portions 47, as shown in Figs. 2, 6, and 7. These yokes are shown secured to the nonmagnetic backing plate by means of four preferably nonmagnetic screws or bolts 48 which pass through the plate and threadedly engage the enlarged end portions 46 of the yokes 45. As will be observed from Fig. 7, the heads of these screws are positioned in enlarged recesses 49 formed in the supporting member 35, in order to allow freedom of movement of the stator assembly 36 relative to the supporting member.

I provide a permanent magnet formed preferably by a plurality of magnetized elements 49' to produce a constant field flux for the alternators, thus making the device independent of any outside excitation. As indicated in Figs. 1 and 6, these magnets, of platelike form, are positioned in end-to-end engagement with the magnetic yokes 45 and are supported on the projecting portions 47 of the yokes within a partially closed box formed by the nonmagnetic backing plate 37, the ends 46 of the yokes, a nonmagnetic side plate 50, and a nonmagnetic cover plate 51. The side plate may be constructed of any suitable nonmagnetic material such as aluminum, for example, and it is secured to the enlarged end portions 46 of the yokes by means of a plurality of magnetic bolts or screws 52. The thin cover plate 51, which may likewise be constructed from any suitable nonmagnetic material, is secured to the end portions 46 by a plurality of screws and serves to prevent the magnet elements 49' from dropping out of position. I may provide additional means in the form of a magnetic shunt 53 bridging the magnetic bolts 52 for adjusting the flux produced by the magnets in the yokes 45 to the desired value. With the foregoing arrangement the two machines always have the same field flux so that voltage adjustments once made remain fixed.

The permanent magnet elements 49' are preferably composed of a high coercive force magnetic material in order to produce a strong field with a minimum volume of magnetic material and at the same time provide a magnet which is highly resistant to demagnetizing influences. My invention is, of course, not restricted to the use of any particular material for the magnet elements 49', but I have found that an alloy composed of nickel, iron, and aluminum as the essential ingredients is satisfactory for this purpose. Such an alloy has been produced having a coercive force of approximately 450 oersteds. A suitable composition I have found to be approximately 20 per cent nickel, 16 per cent aluminum, and, if desired, also a small percentage of cobalt. Also, by adding a small amount of copper a better heat treatment may be applied to large size magnets. However, a wide variation in percentages is permissible. The magnet is preferably constructed in a plurality of sections 49' to obtain uniform hardness.

Each of the alternator stator assemblies includes two pole pieces 54 which are connected by the yokes 45 to the permanent magnet elements 49'. As indicated, each pole piece comprises two inwardly projecting salient poles thereby providing four salients facing the rotor element of each generator. The magnetic laminations 54 of soft iron which form each pole group are adapted to rest against the underneath surface 56 of the yokes 45, as shown in Figs. 2 and 8, and they are clamped together and held in engagement with the surface 56 by means of a plurality of side plates 57 of magnetic material maintained in position by means of a plurality of bolts 58. The stator coils 59, from which the alternating current voltages are obtained, are wound about each of the laminated salient pole pieces. Considering now the two salients on each pole piece, they are so constructed that at a particular instant one of the salients has a certain number of teeth in the matched position with the rotor teeth and the other has the same number of teeth in the unmatched position. Therefore, the unidirectional flux from the permanent magnet which traverses the yokes 45 will be constant in amount but this flux will oscillate between the two salients in the soft iron laminations which form the pole pieces 54. This shifting of the flux from one of the salient poles of each group to the other pole of that group takes place at intervals determined by the number of teeth and the speed of the rotor. As a result of this phenomena an alternating voltage appears at the output terminals of the stator coils.

While the salients which form the two pole groups of each alternator have been illustrated and described as being of a particular construction, I wish to call attention to the fact that modifications may be made in the magnetic circuit of the stator to improve the performance characteristics. For example, the length of the oscillating flux path may be further reduced to reduce the losses, and certain changes may be made under various conditions to reduce the internal reactance and the demagnetizing force due to armature reaction.

Referring to Figs. 2 and 8, I may provide an eccentric block 60 of nonmagnetic material between the supporting member 35 and the outer end of each of the magnetic yokes 45 to aid in positioning the stator assembly 36 when adjustments are made to the latter by moving the backing member 37, and to prevent vibration by forming a more rigid structure. The block may be clamped between the support 35 and the plate 57 of the yoke by means of a nonmagnetic bolt 61 having clearance 62 with the support 35. The eccentric block is positioned on a shoulder 63 so that by turning the block, it aids in raising or lowering the stator assembly. If desired, however, I may employ any member composed of nonmagnetic material in place of the eccentric block 60 to give rigidity to the structure. It should be emphasized however that the block 60 in many cases may be dispensed with entirely by carefully proportioning the weight of the yokes and by providing the proper flux distribution. In any case it adds rigidity to the structure.

I provide means restraining the stator elements against rotation relative to the shaft 11. In the arrangement illustrated this comprises a tie rod or bar 64 which is attached at one end to a bracket member 65 secured to one side of the interconnecting frame or cradle 33, and at the other end to a bracket 66 which is attached to the ship framework or other supporting structure. If for any reason the tie rod should break or become unfastened from the brackets 65 and 66, the stator elements and the tie member 33 would tend to turn with the rotor element and would become damaged by falling away from the shaft. I provide means in the form of a semicircular sling 67 positioned under the shaft 11 with its end portions 68 secured to the underneath surface of the interconnecting member 33, for preventing such an occurrence. This arrangement allows sufficient flexibility to provide for lateral or vertical motion of the shaft without disturbing the relative position or spacing of the rotor and stator.

As a result of the foregoing construction which carries the stator elements of the two generators, wherein the saddle or interconnecting frame rides on bearing surfaces carried by the shaft, relative movements of the shaft and the vessel or other supporting framework are not allowed to affect the accuracy because the stators and rotors of these generators are in effect made together as a single unit.

In order to shield the apparatus from dust, magnetic particles and the like, which would interfere with its operation, I provide a cover which may be constructed of aluminum or other suitable nonmagnetic material and which is preferably made in a plurality of both upper and lower sections 69 and 70, respectively, in order that it may be readily assembled around the shaft. The various sections are secured to the interconnecting framework 33 which supports the stator elements. So far as the operation of the apparatus is concerned, it is not necessary that the lower section 70 be constructed of nonmagnetic material, since magnetic material would not influence the operation.

An oil chamber 71 is formed in the lower section 70 of the cover member, through which rotates the disk 30 of the spider element 14. To provide adequate lubrication for the bearing surfaces 29 and 34, I mount an oil scraper 72 on the cradle or tie member 33 above the bearing surfaces. This scraper is biased by a spring 73 in engagement with the surface 74 of the disk 30 thereby causing the oil picked up by the disk to pass from the disk through the vertical passage 75 in the frame 33 to the recessed portion 76 in the stator bearing surface 34. Thus only occasional checking of the oil level through the gage glass is necessary. If necessary, I may provide suitable deflecting means for preventing the oil disk 30 from unduly throwing oil to interfere with the operation of the apparatus.

In the assembly of the apparatus, when detachable base rings are used, the collars 15 are first secured to the shaft in proper spaced relation and centered. The parts forming the rotor spider 14 are fastened to the base ring, one half at a time, by means of the bolts 19 and are adjusted until the rotor runs true by rotating the shaft a fraction of a revolution at a time and making measurements each time with a dial indicator. The two halves of the rotor spider are clamped together by means of the bolts 21 and 22. As a result the rotor bearing surface 29 and the surface 23 on which the rotor laminations are assembled are concentric with the shaft. The rotor laminations are then secured in position on the surface 23 of the spider and they are preferably ground to assure a concentric outer surface. The interconnecting frame 33 may then be positioned with its bearing surfaces 34 on the rotor bearing surfaces 29 and the tie rod 64 connected as shown. The nonmagnetic backing plate 37 is secured to the supporting member 35 and the stator assembly 36 is in turn fastened to the backing plate as described. By rotating the shaft 11, and measuring the individual voltages of the alternators, the air gap 31 and the shunt 53, if the latter is necessary, may be adjusted as already described to produce the proper field flux to make the generated voltages equal and of the desired magnitude for a given speed. Also, the stator assemblies may then be rotated relative to each other as described to produce exact phase opposition which, with both generated voltages equal, may be indicated by a zero reading on a voltmeter connected across the outer terminals of the machines when their stator coils are connected in series opposed relation. The cover plates may then be placed in position on the framework 33.

In order to clarify the operation of the apparatus of my invention I have appended hereto the vector diagram of Fig. 9. Referring now to Fig. 9, the vectors $E_{12}$ and $E_{13}$ may be considered to represent the instantaneous maximum values of the respective generated voltages of the two alternators which are adjusted to equal magnitude and phase opposition with zero torque or zero horsepower in the shaft. Assume now that a load is placed on the revolving shaft 11. The torque will cause a small amount of twist in the shaft so that the phase displacement of the generated voltages is no longer 180 degrees but is now $(180-\theta)$ degrees, where $\theta$ is the electrical phase shift of the voltages. Under such conditions there will be a resultant voltage, the instantaneous maximum value of which is represented by the vector R. Inasmuch as the vectors $E_{12}$ and $E_{13}$ are two equal harmonically varying quantities of the same frequency, the resultant curve is also a harmonically varying quantity, which in this case is a sine wave, of the same frequency. Assume that voltage $E_{12}=E_{13}=E$, then from Fig. 9 it may be readily found that $$R = 2E \sin \theta/2 \qquad (1)$$

It will be seen from this equation that the resultant voltage varies as the sine of half the angle of phase displacement, but for values of $\theta$ up to 20 degrees the sine of the angle differs from the angle itself by only ½ per cent and is less than ⅘ per cent variation for 25 degrees. Thus, in the apparatus described a straight-line relation is assumed to exist between an angle and its sine, so that the above equation becomes $$R = E\theta \qquad (2)$$

where $\theta$ is in radians.

Equation 2 shows that the magnitude of the resultant voltage, of which R represents the instantaneous maximum value, is a function of the magnitude of the individual generated voltages and the angular phase displacement between them. Since the voltage E varies with the speed (N), and the angle ($\theta$) varies in proportion to the torque transmitted (T), Equation 2 may be rewritten as $$R = KNT \quad (3)$$

Inspection of Equation 3 at once discloses that this is the formula for horsepower. Thus the magnitude of the voltage R is proportional to horsepower.

As an example of a particular arrangement which has operated satisfactorily, I employ alternators having 180 teeth on their rotors, with the generators spaced approximately 30 inches apart on the shaft. With this arrangement each rotor tooth covers a complete electrical cycle as it passes a stator tooth. There are, therefore, 180 complete electrical cycles for each revolution of the shaft so that the electrical phase angle displacement is 180 times as great as the actual angle of shaft twist. Thus, with my arrangement I may space the rotors closely together and still have the necessary sensitivity.

It will thus be seen that the sensitivity of this measuring device can be altered for certain shafts by changing the number of electrical cycles around the periphery of the shaft, e. g. by altering the rotor teeth. I wish, therefore, to call attention to the fact that if desired, and within my invention, the particular ratio of electrical to mechanical degrees and rotor spacing may be altered to suit the particular requirements.

Referring now to Equations 2 and 3, the theory of my invention is that a horsepower indicating device must contain a linear relation for the voltage factor representing torque and a linear relation for the voltage factor representing speed. Thus, I prefer to employ alternating current generators having a low internal inductive reactance, because it follows from the foregoing statement that, in order to measure true horsepower, it is necessary to measure the current in a purely resistive circuit or a circuit of practically unity power factor.

In Fig. 10 I have illustrated schematically an electrical circuit diagram of apparatus for measuring instantaneous values of horsepower, torque, or speed, and to measure the energy in terms of horsepower-hours over a period of time. As illustrated, the stator coils 59 of the two alternators 12 and 13 are connected together in series opposition. I connect an electrical measuring instrument such as a milliammeter or microammeter 79 of the indicating or recording type in circuit with a resistance 80 and a switch 81 across the terminals 77 and 78 of the alternators. When the instrument is in circuit with the resistance it may be calibrated to read in terms of horsepower, since Equation 3 demonstrates that the magnitude of the resultant voltage R across the terminals is proportional to the horse-power transmitted by the shaft. With a pure resistance circuit, even though the frequency of the generated voltages varies in accordance with the speed of the shaft 11 the instrument 79 may nevertheless be calibrated to give a true horsepower reading.

Referring again to Equations 2 and 3 it may be seen that the measuring device 79 could be calibrated to read torque accurately only for a single predetermined constant speed, so long as it is connected in circuit with the resistance element 80. Now the theory underlying another aspect of my invention is that by reading the current in a purely inductive circuit, I may obtain thereby a quantity which is proportional to torque. I have found therefore that if I connect the instrument 79 in circuit with an inductance, I may obtain a true reading of the torque transmitted. The instrument 79 may be connected in circuit with the inductive element or reactance 82 across the alternator terminals by throwing the blade of the single-pole-double-throw switch 81 to the b position. According to Equation 2 the resultant voltage tending to send current through the instrument when the latter is connected in circuit with the reactance element 82 is directly proportional to the generated voltage of each alternator and the angle of phase displacement. Thus to read torque the effect of variations in the resultant voltage due to speed changes must be eliminated from the measurement results. With my arrangement even though the generated voltage E varies in direct proportion to the speed, the frequency of this voltage likewise varies directly with the speed, producing a corresponding variation in the magnitude of the impedance offered to the flow of current through the reactive device 82. Consequently, speed changes do not affect the indications of the instrument 79 when in circuit with the inductive element 82 and under such conditions it will read only in proportion to that component of voltage across the terminals 77 and 78 which is due to the twist in the shaft or the phase displacement between the two voltages. In effect then one may look upon this as a measurement with a single indicating electrical instrument of the mechanical twist in the shaft in terms of decimals of an inch, or the like, for all speeds. This is true since the reading obtained is independent of the shaft speed. Thus by providing two scales for the instrument 79, it may be calibrated to read both torque and horsepower, thereby dispensing with the necessity for an additional instrument. However, if it is desired to obtain simultaneous readings of torque and horsepower, then two instruments are necessary.

The numeral 83 designates a voltmeter connected across the terminals of one of the alternators which may be calibrated in terms of speed or voltage or it may have a scale for both quantities.

I prefer to connect capacitors 84 and 85 across the terminals of alternators 12 and 13 inasmuch as such an arrangement enables me to use alternators of smaller output capacity with satisfactory operating characteristics such, for example, as a constant terminal voltage output for all loads. However, by increasing the size of the generators or rearranging the armature coils, satisfactory performance in this regard may be obtained omitting these capacitors.

To obtain an integrated measurement of the horsepower transmitted, I may employ an alternating current induction meter 86 of the watthour meter type provided with a highly reactive coil element 87 and a low impedance coil element 88. The coil 87 is connected across the terminals 77 and 78 and the coil 88 is also connected to these terminals in circuit with a resistance 89 and a capacitor 90. The two latter elements serve to compensate the meter for errors due to frequency variations. The meter is provided with the usual shaft 91 which is driven by a current conducting disk 92 and connected to a registering device 93. To provide the necessary damping of the meter, I provide a paddle wheel arrangement 94 in which the damping is proportional to the square of the speed. The meter 86 may thus be calibrated to give a reading in terms of horsepower-hours. I do not wish to limit my invention to the use of a particular type of meter for measuring horsepower-hours, since it will be appreciated that other types may be employed with satisfactory results over a wide frequency range including those of the direct-current motor meter type using a permanent magnet field and a rotor with a commutator collecting rectified current from the terminals 78 and 77. But because of the possibility of commutator trouble, I prefer to employ the arrangement illustrated.

The section of the shaft 11 employed will ordinarily be calibrated at the factory. The torsional deflection data obtained when the shaft is calibrated may thus be used in calibrating the scales of the instrument 79 and the horsepower-hour meter 86 to read correctly for a particular shaft of known deflection characteristics. After installation, it is necessary only to run the shaft with no torque and check the indicator at zero and at full scale. Once made, the calibration is permanent.

I have thus provided a dependable transmission dynamometer for investigating the operation of propulsion plants. The apparatus requires no external source of power for its operation thereby avoiding the use of voltage regulators, slip rings, contacts, and the like. In order to determine the totalized horsepower-hours consumed by the load over a given time interval, it is merely necessary to take the difference of the readings of the horsepower-hours registered at the beginning and at the end of the interval.

The use of the apparatus of my invention enables one to obtain accurate comparisons in fuel consumption, oiler efficiency and overall apparatus performance under various conditions of operation. In the case where the apparatus is used in connection with ship propulsion machinery, the instruments may be duplicated for obtaining readings at a plurality of positions such as, for example, in the engine room, on the bridge of the vessel, or at the chief engineer's desk. One may provide an automatic log record so that at the end of every trip, there will be a complete record on paper of the power delivered to the propeller throughout the trip.

By rigidly connecting the two stator elements together with a stiff interconnecting structure, a fixed angle is maintained between the two armatures regardless of any lack of rigidity of the ship's frame or other supporting structure, and by mounting these same stator elements on bearing surfaces which move in accordance with the rotor elements and the shaft, the two relatively rotatable parts are made rigid in a radial direction in regard to the motion of the shaft. As a result the measuring apparatus is free from errors due to displacement in the framework of the ship or other supporting apparatus as well as sudden load variations. This factor together with the amplification of the mechanical angle of twist in terms of electrical phase displacement between two generated voltages enables me to measure the torsion or small angular motions in a propeller shaft or other rotary load transmitting element so accurately that only a short section of the power transmitting shaft need be used. In many instances this latter feature is a distinct advantage, particularly where economy of space is of paramount importance.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. In a transmission dynamometer, a rotatable shaft for transmitting power from a prime mover to a load of variable speed and torque characteristics, two alternating current generators having their rotors and stators spaced apart and having said rotors mounted on said shaft for rotation therewith, means connecting said generators in series circuit relation, a pair of output terminals from said generators, an electrical measuring instrument, an inductive element, a resistance element, and means for selectively connecting said measuring instrument in circuit with said inductive element or said resistance element across said output terminals, said electric measuring instrument being so constructed and arranged that when connected in circuit with said resistance element said instrument measures the horsepower of the load having said variable characteristics and when connected in circuit with said inductance element said instrument measures the torque transmitted to said load.

2. In a transmission dynamometer for determining the torsional deflection under all conditions of load between two axially spaced points of a rotating shaft employed for transmitting power to a load, means including two alternating current generators for producing two voltages whose phase displacement varies in accordance with the twist in the shaft between said points, one of the alternating current terminals of one of said generators being connected to one of the alternating current terminals of the other of said generators, and means connected to the other terminals of said generators for measuring the phase displacement between said voltages, said means including an electrical instrument and an inductance element connected in series.

ALFRED V. MERSHON.